US005173680A

United States Patent [19]

Kumagai

[11] Patent Number: 5,173,680

[45] Date of Patent: Dec. 22, 1992

[54] SYSTEM AND METHOD FOR INDICATING AN ABNORMAL CONDITION IN A VEHICLE WITH A MULTI-LEVEL POSITIONER INDICATOR

[75] Inventor: Chiaki Kumagai, Saitama, Japan

[73] Assignee: Honda Giken Kogyo Kabushiki Kaisha, Tokyo, Japan

[21] Appl. No.: 742,486

[22] Filed: Aug. 5, 1991

Related U.S. Application Data

[63] Continuation of Ser. No. 272,434, Nov. 17, 1988, abandoned.

[30] Foreign Application Priority Data

Nov. 18, 1987 [JP] Japan ............................ 62-291246

[51] Int. Cl.[5] ............................ B60Q 1/00

[52] U.S. Cl. ............................ 340/439; 340/461; 340/691

[58] Field of Search ............... 340/439, 459, 441, 461, 340/451, 462, 438, 691; 364/424.03, 431.03

[56] References Cited

U.S. PATENT DOCUMENTS

| | | | |
|---|---|---|---|
| 3,855,572 | 12/1974 | Olson | 340/441 |
| 4,136,329 | 1/1979 | Trobert | 340/459 |
| 4,317,107 | 2/1982 | Trattner | 340/439 |
| 4,502,868 | 2/1985 | Tokitsu et al. | 340/459 |
| 4,723,215 | 2/1988 | Hibino et al. | 340/439 X |

*Primary Examiner*—Jin F. Ng
*Assistant Examiner*—Jeffery A. Hofsass

[57] ABSTRACT

An indicating device for indicating operation conditions within an engine includes a set of one-shot pulse generators. These one-shot pulse generators control the regulation of drive signals to indicating devices such that the indicating device provides information that an abnormal condition is present. The one-shot pulse generators do not operate under normal conditions.

21 Claims, 4 Drawing Sheets

SYSTEM AND METHOD FOR INDICATING AN ABNORMAL CONDITION IN A VEHICLE WITH A MULTI-LEVEL POSITIONER INDICATOR

This application is a continuation of application Ser. No. 07/272,434 filed on Nov. 17, 1988 now abandoned.

FIELD OF THE INVENTION

The present invention relates to an indicating device for a vehicle for indicating the operating condition of the vehicle, such as a running speed of the vehicle or the rotational speed of the engine which is used to propel the vehicle. More particularly, the present invention is related to an indicating device which indicates normal operating conditions of the vehicle but also indicates abnormal operating conditions when present.

BACKGROUND OF THE INVENTION

In recent years, various control devices have been used in association with vehicles, such as a car, motorcycle, and the like. These control devices have included air/fuel ratio controlling devices for regulating the air/fuel ratio of the engine; ignition timing controlling devices for regulating the ignition timing of the engine; and so forth. In association with this need to provide control devices for the engine of a vehicle, it has also become desirable to inform the operator of the vehicle as to whether or not the operating conditions of the vehicle are functioning normal. It also has become desirable to inform the operator as to whether or not the various sensors for collecting information concerning the engine parameters, which are necessary for the controllers to properly accomplish their controlling operations, are functioning normally. Thus, selected indicating devices, such as indicator lamps or the like, for indicating certain operating conditions for the individual control devices or the individual sensors were provided on a cowl board on which gauges and meters such as a speedometer and engine tachometer were also located.

However, if an indicating device is provided for each of the control devices or sensors on the cowl board of, for example, a motorcycle, as described above, the number of indicating devices will increase as the amount of information to be indicated increases. This increase in the number of indicating devices will cause an increase in the size of the cowl board. This increase in the size of the cowl board is not desirable nor practical when considering the requirements for the miniaturization of a vehicle, such as a motorcycle.

SUMMARY OF THE PRESENT INVENTION

Accordingly, it is an objective of the present invention, in view of the circumstances described above, to provide an indicating device for a vehicle wherein more information can be displayed upon a compact cowl board.

It is another objective of the present invention to provide a single indicating device which will display a multitude of abnormal operation conditions.

It is still another objective of the present invention to provide a single indicating device which will display both a normal operating condition and an abnormal operating condition.

It is still further another objective of the present invention to provide an indicating device capable of displaying a multitude of abnormal operating conditions on a compact cowl board for a motorcycle.

To attain these objectives, an indicating device for a vehicle, according to the present invention, is constructed such that a driving signal, which is generated by a driving signal generating device and having contents which vary in response to a parameter of the operation of the vehicle, is replaced by a driving signal having predetermined contents when an abnormal condition detecting device detects an abnormal condition in the operating conditions of the vehicle, thereby causing the indicating device to display information in accordance with the contents of the driving signal. The contents of the driving signal will cause the indicating device to either inform the operator that conditions are normal or that there is an abnormal condition.

BRIEF DESCRIPTION OF THE DRAWINGS

The present invention will become more fully appreciated from the detailed description given below and the accompanying drawings which are given by way of illustration only, and thus are not limitative of the present invention, wherein.

DETAILED DESCRIPTION OF THE PRESENT INVENTION

Figure 1:
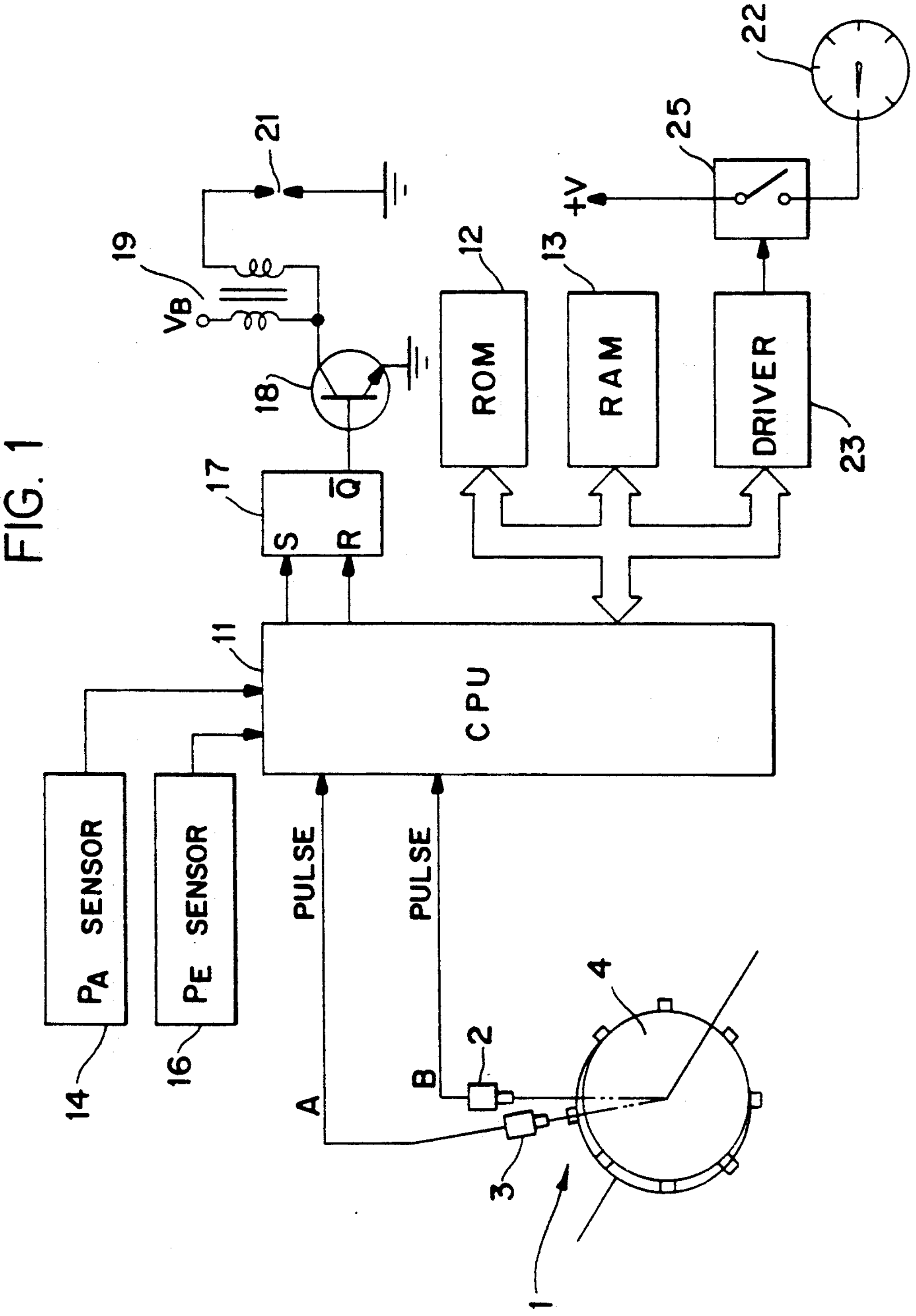
FIG. 1 is a block diagram of a device of a preferred embodiment of the present invention.

A preferred embodiment of the present invention will be described with reference to the accompanying drawings. Like reference items in the drawings refer to the same element through out.

As shown in FIG. 1, an indicating device for a vehicle, according to the present invention, is constructed in such a manner as will be described below.

In particular, two kinds of pulses, A and B, are generated by a pulse generator 1 in response to the rotation of a crankshaft in the engine that is used to propel the vehicle. The pulse generator has a rotating shaft which rotates in accordance with the crankshaft of the engine, and sensors 2 and 3, sensing the rotation of the shaft to produce the pulses, B and A, respectively. One A pulse is generated for each complete rotation of the engine while a B pulse is generated for each time the crankshaft makes a predetermined angular rotation through a certain arc length. It is to be noted that these pulses are engine rotational speed signals. The periods of the pulses will vary in response to a change in the engine's rotational speed.

These pulses are supplied to a microcomputer comprising of a CPU 11, a ROM 12, and a RAM 13. Furthermore, the microcomputer is designed to receive various engine parameters which are necessary for the various controls of the engine, for example, sensor output signals corresponding to atmospheric pressure and suction air pressure. An atmospheric pressure sensor 14 is used to detect the atmospheric pressure, while a suction air pressure sensor 16 is used to detect the air pressure within a suction pipe contained within the engine of the vehicle. The various engine parameters may also include oil pressure, engine temperature, exhaust emissions purity, and the like.

The CPU 11 operates in response to the pulses and sensor output signals supplied to it. The CPU 11 uses these pulses and signals to calculate, for example, the ignition timing of the engine, in accordance with several programs which are stored in the ROM 12 and the RAM 13. The signals may also be used to determine when an engine fan is to be turned on for cooling purposes. These programs will be described more fully below at a later time. In the preferred embodiment, the CPU 11 supplies an instruction signal based upon the results of the above calculation to a flip-flop 17. This flip-flop 17 causes a transistor 18 to switch "on or off" which in turn regulates the supply of electric current to the primary side of an ignition coil 19. This switching by the transistor 18 further regulates the ignition timing of an ignition plug 21. This ignition circuit may also be an electronic or solid state ignition circuit. The CPU 11 may also, in response to the pulses and sensor output signals, calculate the amount of electric current to be supplied to the engine's tachometer 22. In the preferred embodiment, the CPU 11 supplies an instruction signal based on the results of the calculation to a driver circuit 23. This driver circuit 23 operates in response to the instruction signal from the CPU 11 to cause a switch 25 to switch "on and off" so that this switch 25 regulates the supply of electric current flowing to the engine's tachometer 22. It is also possible to use a contactless switch, such as a transistor, in lieu of a contact switch 25. The operation of the CPU will be described below.

Figure 2:
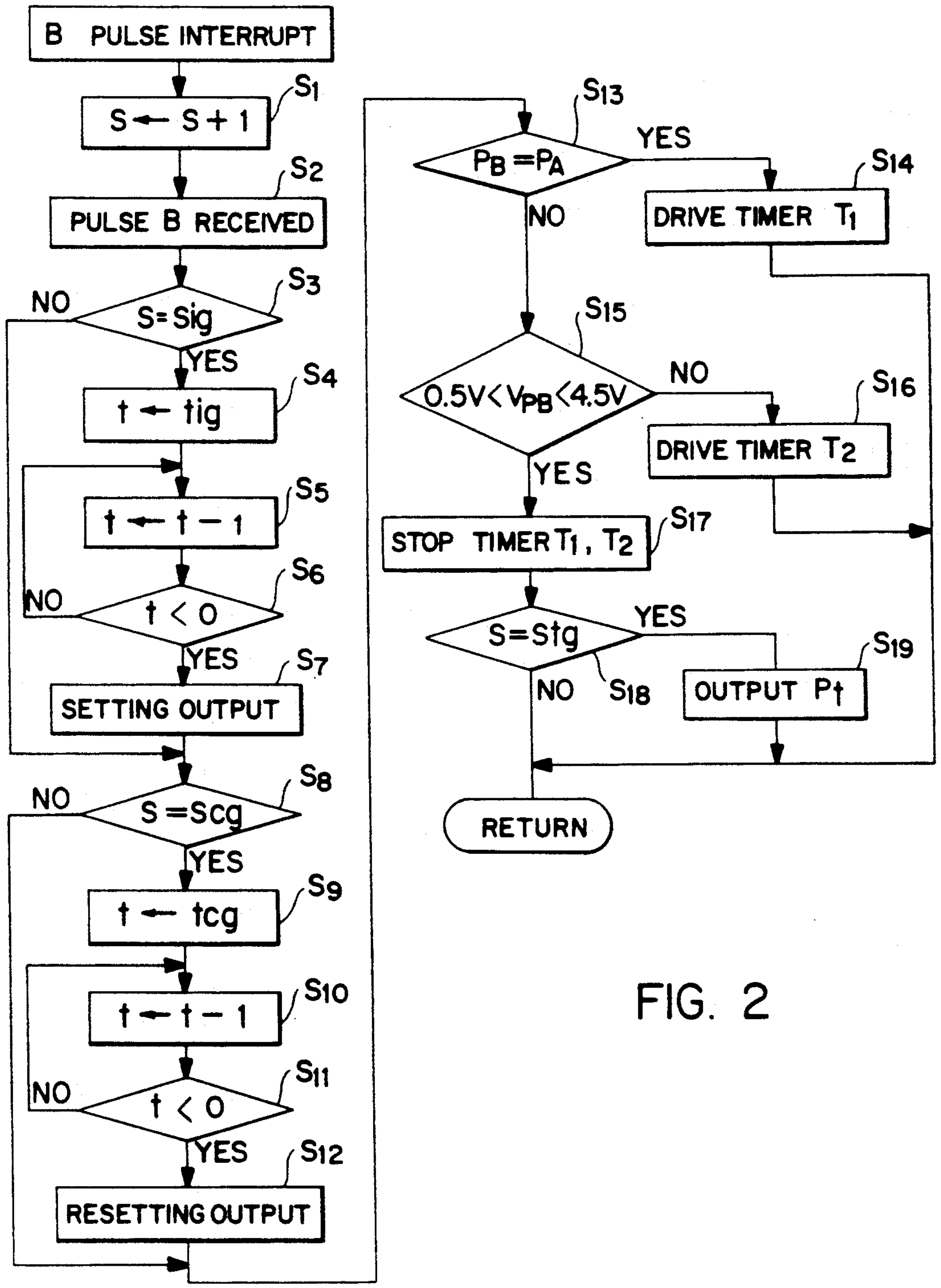
FIGS. 2 through 4 are flowcharts illustrating the operation of the preferred embodiment shown in FIG. 1.
Figure 3:
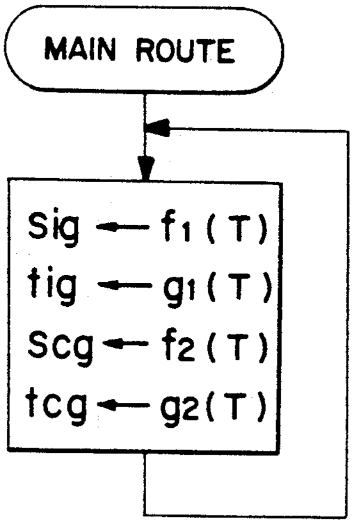
Figure 4:
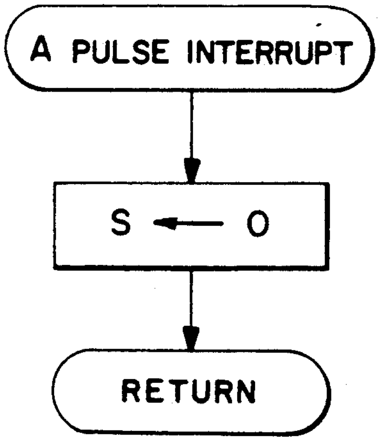

FIGS. 2 through 4 are flowcharts of the control program for controlling the operation of CPU 11. The flowchart of FIG. 2 is a B pulse interrupt subroutine which is executed upon interrupting a main routine shown in FIG. 3 each time a B pulse is received. The main routine is utilized by the CPU to continually monitor and control the operating conditions of the engine. In the flowchart of FIG. 2, if the main routine is interrupted, the count value S of a stage counter is incremented by one (Step $S_1$). Subsequently a period T of the B pulse is received (Step $S_2$). It is then determined whether the stage count value S is equal to an ignition stage count value $S_{ig}$(Step $S_3$). The ignition stage count value $S_{ig}$ is normally stored in the RAM 13. The process for establishing the $S_{ig}$, ignition stage count value, will be described later.

When it is determined at Step $S_3$ that S equals $S_{ig}$, that is the crank angle is approximately equal to an ignition angle, a timing count value t is set to an ignition interrupting trigger counter value $t_{ig}$(Step $S_4$). The ignition interrupting trigger count $t_{ig}$ is read from the RAM 13. The ignition interrupting trigger count value $t_{ig}$ can be calculated using a function value $g_1(t)$. Subsequently, the set timing count value t is repetively decremented by 1 (Step $S_5$) so long as a comparison, between the magnitude of t and 0 (Step $S_6$), determines that t is greater than or equal to 0. When t is less than 0, ignition timing commences. Also, when t is less than 0, an energization stopping instruction, a setting signal output, is supplied to the set input terminal of the flip-flop 17 (Step $S_7$). Upon receiving this signal, the output of the flip-flop 17 changes from a high level to a low level so that the transistor 18 is turned off, thus interrupting the flow of electric current to the primary side of the ignition coil 19. Consequently, the ignition plug 21 is ignited.

However, if it is determined at Step $S_3$ that S is not equal to $S_{ig}$, the routine jumps to Step $S_8$ to determine whether the stage count value S is equal to an energization stage count value $S_{cg}$(Step $S_8$). The energization stage count value $S_{cg}$ can be set by a program, as shown in FIG. 3, and stored in the RAM 13. When it is determined at Step $S_8$ that S equals $S_{cg}$, an energization timing value $t_{cg}$ is written into the RAM 13. The energization timing value $t_{cg}$ is set as a count value t in a timing counter (Step $S_9$). Subsequently, the set timing count value t is repetively decremented by 1 Step $S_{10}$) so long as a comparison, between the magnitude of t and 0 (Step $S_{11}$), determines that t is greater than or equal to 0. When t is less than 0, energization timing commences. Accordingly, an energization starting instruction, a resetting signal output, is supplied to an input terminal of the flip-flop 17 (Step $S_{12}$). Upon receiving this energization starting instruction, the output of the flip-flop 17 changes from the low level to the high level so that the transistor 18 is turned on. The turning on of the transistor 18 starts the supply of electric current to the primary side of the ignition coil 19.

Figures 6A, 6B, 6C, 6D:
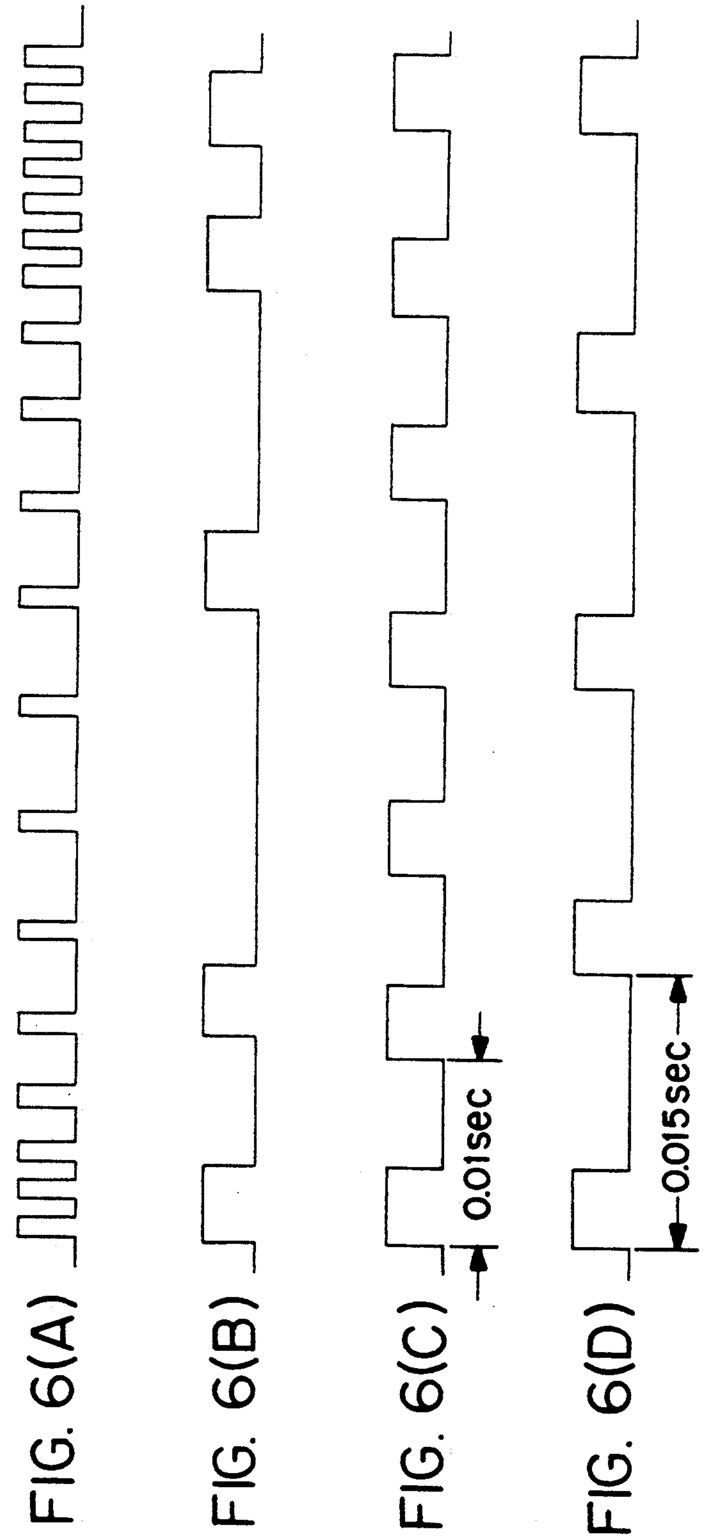
FIGS. 6A and 6D are waveform diagrams of B pulses in the preferred embodiment of FIG. 1, and of the pulse current supplied to the engine's tachometer.

On the other hand, if it is determined at Step $S_8$ that S is not equal to $S_{cg}$, the resetting signal output is not supplied to the reset input terminal of the flip-flop 17, and the process jumps to Step $S_{13}$. At Step $S_{13}$, it is determined whether or not a suction air pressure $P_B$ and an atmospheric pressure $P_A$ are equal to each other. When it is determined that $P_B$ equals $P_A$ (Step $S_{13}$), it has been determined that an abnormal condition exists with regards to the pipe used in the suction system within the engine, and a one-shot pulse generator timer $T_1$ for generating a signal pulse having a predetermined period (for example, $1\times10^{-2}$ sec) is rendered operative (Step $S_{14}$). The timer $T_1$ is built into the microcomputer, and a pulse generated from the timer $T_1$ is supplied to the driver circuit 23. This driver circuit 23 closes the switch 25 for a predetermined period of time (for example, $3\times10^{-3}$ secs) upon each pulse received from the timer. This closing of switch 25 supplies electric current to the engine tachometer 22. In this instance, the waveform of pulse currents supplied to the engine tachometer 22 is such as shown in (C) of FIG. 6.

The engine's tachometer 22 is designed to produce an indication display corresponding to the electric current supplied for a certain unit of time. As the number of times the switch 25 is closed per unit of time increases, the engine tachometer 22 provides a display which indicates that a high engine rotational speed exists.

Figure 5:
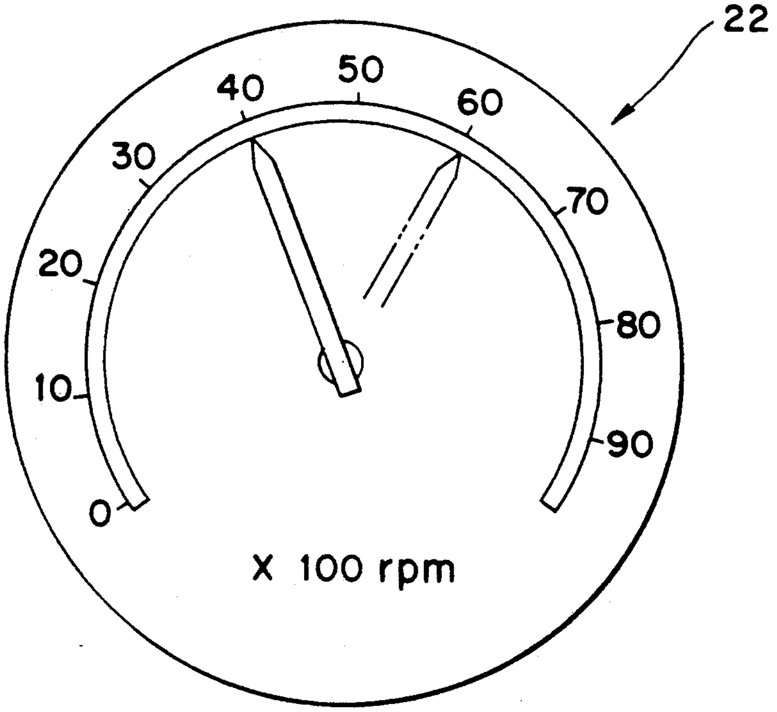
FIG. 5 is a diagram showing an engine's tachometer.

Accordingly, since the electric current supplied per unit of time is a fixed value during the operation of the one-shot pulse generator timer $T_1$ which corresponds to a case wherein an abnormal condition, such as the pipe of the suction air measuring instrument being disconnected, is detected, the engine's tachometer 22 (or multi-leved positioner indicator) indicates, for example, 6,000 RPMs, independently of the actual rotational speed of the engine. This is shown by the two-dot chain line in FIG. 5.

When it is determined at Step $S_{13}$ that $P_B$ does not equal $P_A$, the process jumps to Step $S_{15}$. At Step $S_{15}$, it is further determined whether or not the voltage value $V_{PB}$ of an output signal received from the suction air pressure sensor 16 is within the range of 0.5V and to 4.5V (Step $S_{15}$). If it is determined that $V_{BP}$ is not within that range, it indicates that the suction air pressure sensor 16 is not operating normally due to a problem, such as a disconnected wire or short-circuiting, and another one-shot pulse generator timer $T_2$ for generating a single pulse having a predetermined period (for example, $1.5\times10^{-2}$ secs) different from that of the one-shot pulse generator timer $T_1$ is rendered operative (Step $S_{16}$). Pulses generated by the timer $T_2$ are supplied to the driver circuit 23 similarly to the pulses generated by the timer $T_1$. Accordingly, the waveform of the pulse current supplied to the engine tachometer 23 is as shown in (D) of FIG. 6. This waveform causes the engine tachometer 22 to indicate, for example, 4,000 RPMs, as indicated by the solid line in FIG. 5, independently of the actual rotational speed of the engine.

The 6,000 RPM location as described above and the 4,000 location on the tachometer can be accordingly labelled with labels indicating the exact abnormality that is being detected. This will allow the operator to immediately realize the problem and avoid any damage to the engine if the abnormality is a serious condition.

When it is determined at Step $S_{15}$ that $V_{BP}$ is within the range of 0.5V to 4.5V, it indicates that the suction air pressure sensor signal is free from trouble and is operating normally. The operation of the one-shot pulse generator timers $T_1$ and $T_2$ are not commenced, or the timers are stopped if they are operating at this time (Step $S_{17}$). Subsequently, it is determined whether or not the stage count value S is equal to a predetermined driving stage count value $S_{tg}$ (Step $S_{18}$).

When one complete rotation of the engine is completed in the present embodiment, the value, for example, of $S_{tg}$ can be equal to 1 or 5 or else to both of these values, but when the tachometer 22 indicates a reading of 6,000 RPMs during the operation of the one-shot pulse timer $T_1$, as described above, it is desirable for the value of $S_{tg}$ to assume either 1 or 5. Further if the values 1 and 5 are adopted for the values of $S_{tg}$, it is necessary to employ, as the tachometer 22, such a tachometer that indicates 3,000 rpms during the operation of the one-shot pulse timer $T_1$ and indicates 2,000 RPMs during the operation of the one-shot pulse timer $T_2$.

When it is determined at Step $S_{18}$ that S equals $S_{tg}$, a single pulse Pt is developed (Step $S_{19}$). The pulse Pt is supplied to the driver circuit 23 similarly to the pulses generated by the timers $T_1$ and $T_2$. Accordingly, if the rotational speed of the engine varies so that the period of generation of the B pulses changes like the waveform of the B pulses indicated in (A) of FIG. 6, the frequency of the pulse signal Pt varies, thereby varying the pulse current per unit of time being supplied to the engine tachometer 22 as indicated in (B) of FIG. 6. The engine tachometer thus makes an indication corresponding to the actual rotational speed of the engine.

FIG. 3 shows a flowchart diagramming a routine for setting the ignition stage count value $S_{ig}$ and a function value $f_1(T)$. The function value $f_1(T)$ is determined from the period T of the B pulse received by the CPU. This function value $f_1(T)$ is written into RAM 13 as the ignition stage count value $S_{ig}$. The function value $f_1(T)$ can also be stored in advance as part of a data map. This routine is executed in a continuous manner, and nonperiodically a calculated updated value of $S_{ig}$ is written into the RAM 13. A similar routine can be used to calculate $t_{ig}$ and $t_{cg}$.

It is to be noted that the stage count value S is reset to 0 when the A pulse is received. The A pulse interrupting subroutine which interrupts both the main routine and the B pulse interrupting subroutine is executed each time an A pulse is received.

As apparent from the above description, according to the preferred embodiment of the present invention, the pulse generator 1 and the microcomputer 5 function as a driving signal generating means for generating a driving signal having contents which vary in response to the operating parameters of the engine, such as a rotational speed of the engine, while the engine tachometer 22 functions as an indicating device for indicating the various abnormal operating conditions and normal operation conditions of the engine. The atmospheric pressure sensor 14, suction air pressure sensor 16, microcomputer, and the one-shot pulse generator timers $T_1$ and $T_2$ function as a device for replacing the contents of a driving signal with a predetermined contents when an abnormal condition is detected.

It is to be noted that since in the present invention the ignition timing control and the driving control of the engine's tachometer are controlled by a single microcomputer, common circuit parts necessary for both controls can be commonly used, thus the complication of the circuit construction can be minimized.

Further, while in the embodiments described above, an abnormal condition is indicated immediately after it has been detected, an indication of an abnormal condition may be made only for a predetermined period of time after connection of the power source to the microcomputer.

Furthermore, while the description above has been dedicated to describing a indicating device for indicating the operating conditions for a vehicle in connection with the examples of the engine tachometer of the analog type, the present invention can also be applied to digital type tachometer which employs a liquid crystal display panel. The present invention can also be applied, for example, to a vehicle's speedometer, an engine water temperature meter, and other indicating devices different from the engine's tachometer. Where a digital type device is employed, multiplex transmission of signals using the PCM system is adopted. The indication of a plurality of abnormal conditions individually becomes possible with an indication pattern on an indicating section of the meter corresponding to the plurality of abnormal conditions.

As described above, since the indicating device according to the present invention is constructed such that a driving signal which is generated by a driving signal generating device having contents which vary in response to the parameters of the operating conditions of the vehicle is replaced by a driving signal having predetermined contents when an abnormal condition detecting device detects such an abnormal condition, and the indicating device indicates the operating conditions of the vehicle in accordance with the contents of this driving signal, a plurality of different kinds of information regarding the operating conditions of the vehicle can be indicated using this single indicating device. Therefore, a substantial amount of information can be indicated on a compact cowl board. Further, since there is no necessity for modifying the structure of the indicating device, the present invention can be reduced to practice at a low cost.

What is claimed is:

1. An indicating device for a vehicle comprising:

sensing means, for sensing operating conditions in the vehicle;

drive signal generating means, operatively connected to said sensing means, for generating a first drive signal, said first drive signal having contents corresponding to the operating conditions of the vehicle; and indicating means, operatively connected to said drive signal means, for providing information concerning the operating conditions of an engine in the vehicle;

said drive signal generating means controlling the providing of said first signal provided to said indicating means;

said drive signal generating means including, abnormal condition detecting means, operatively connected to said sensing means, for detecting an abnormal condition in the operating conditions of the vehicle sensed by said sensing means, said abnormal condition detecting means causing said drive signal to be replaced with a second drive signal when said abnormal operation condition is detected, said second drive signal having predetermined contents which are constant and do not vary in accordance with the operating conditions of the vehicle, so that said indicating means provides information by a multi-level positioner indicator that indicates information solely that said abnormal operation condition is present in place of the information of the operating conditions.

2. The indicating device as claimed in claim 1, wherein said abnormal condition detecting means causes said first drive signal to be replaced with said second drive signal only for a predetermined period of time.

3. The indicating device as claimed in claim 1, wherein said indicating means is a tachometer.

4. The indicating device according to claim 1, whereby when said abnormal operating condition information replaces said operating condition, so that upon viewing the indicating means the abnormal operating condition information can be readily identified without confusion with information about operating condition, on said indicating means.

5. The indicating device of claim 1, wherein said multi level positioner indicator is a numeral indicator.

6. An indicating device for a vehicle comprising:

sensing means, for detecting operating conditions in the vehicle;

control means, operatively connected to said sensing means, for providing a first information signal, said first information signal having contents which vary in accordance with the sensed operating conditions of the vehicle;

driving means, operatively connected to said control means, for developing a drive signal corresponding to said first information signal;

switching means, operatively connected to said driving means, for regulating an application of electric current in response to said drive signal; and indicating means, operatively connected to said switching means for receiving said electric current from said switching means for providing information concerning the sensed operating conditions of an engine in the vehicle in accordance with the reception of said electric current;

said control means controlling internal operations of the engine;

sensing means, for detecting operating conditions in the vehicle;

said sensing means providing to said control means an abnormal operating condition signal when said sensing means detects said abnormal operation condition;

said control means, in response to said abnormal operating condition signal, providing a second information signal to said driving means, said second information signal having predetermined which are constant and do not vary in accordance with the sensed operating conditions of the vehicle, so that said indicating means indicates information by a multi-level positioner indicator that is solely information that said abnormal operating condition is present in place of said operating conditions information.

7. The indicating device as claimed in claim 6, wherein said control means replaces said first information signal with said second information signal only for a predetermined period of time.

8. The indicating device as claimed in claim 6, wherein said indicating means is a tachometer.

9. The indicating device as claimed in claim 6, wherein said sensing means includes:

an atmospheric pressure sensor to sense atmospheric pressure, and a suction air pressure sensor to sense air pressure in an air suction pipe in the engine.

10. The indicating device as claimed in claim 6, further comprising:

rotational speed sensing means, operatively connected to said control means, for providing said control means with information concerning actual rotational speed of the engine, thereby causing said indicating means to provide information concerning actual rotational speed when said first drive signal is present.

11. An indicating device for a vehicle as set forth in claim 6 wherein said indicating means is a visual display.

12. An indicating device for a vehicle as set forth in claim 11 wherein said visual display is a sole visual display.

13. A method of communicating information concerning operating conditions in an engine of a vehicle, the information being communicated by an indicating device located on a cowl board of the vehicle, comprising the steps of:

(a) providing a first drive signal to the indicating device such that the indicating device communicates actual normal operating conditions in the engine;

(b) sensing the operating conditions of the engine;

(c) determining if the sensed operating conditions of said step (b) are normal;

(d) developing contents in the first drive signal in accordance with the sensed operating conditions if the sensed operating conditions are determined in said step (c) to be normal;

(e) developing a second drive signal to the indicating device when it is determined in said step (c) that the sensed operating condition is abnormal;

(f) maintaining the second drive signal at a constant value so that the second drive signal does not vary in accordance with the sensed operating conditions; and (g) applying the second drive signal to the indicating device when said step (c) has determined that the sensed operating conditions is abnormal, thereby causing the indicating device to indicate by using a multi-level positioner indicator in place of the operating conditions information, that the abnormal operating condition is present so that only said abnormal condition information is indicated on the indicating device.

14. The indicating device for a vehicle as set forth in claim 1 wherein said indicating means is a visual display.

15. An indicating device for a vehicle as set forth in claim 14 wherein said visual display is a sole visual display.

16. An indicating device for a vehicle comprising:

sensing means, for sensing operating conditions in the vehicle;

drive signal generating means, operatively connected to said sensing means, for generating a first drive signal, said first drive signal having contents corresponding to the operating conditions of the vehicle; and indicating means, operatively connected to said drive signal means, for providing information concerning the operating conditions of an engine in the vehicle;

said drive signal generating means controlling the providing of said first drive signal provided to said indicating means;

said drive signal generating means including, abnormal condition detecting means, operatively connected to said sensing means, for detecting one of a plurality of abnormal conditions in the operating conditions of the vehicle sensed by said sensing means, said abnormal condition detecting means causing said drive signal to be replaced with one of a plurality of second drive signals when said abnormal operation condition is detected, each of said one of a plurality of second drive signals having predetermined contents which are constant and do not vary in accordance with the operating conditions of the vehicle, said one of a plurality of second drive signals indicating a corresponding one of a plurability of corresponding abnormal conditions so that the information on said indicating means indicates solely the abnormal conditions in place of operating conditions.

17. The apparatus of claim 16 wherein said indicating means is a tachometer which includes a needle indicator.

18. An indicating device for a vehicle comprising:

sensing means, for sensing operating conditions in the vehicle;

drive signal generating means, operatively connected to said sensing means, for generating a first drive signal, said first drive signal having contents corresponding to the operating conditions of the vehicle; and a tachometer which includes a needle, operatively connected to said drive signal means, for providing information concerning the operating conditions of an engine in the vehicle;

said drive signal generating means controlling the providing of said first drive signal provided to said tachometer;

said drive signal generating means including, abnormal condition detecting means, operatively connected to said sensing means, for detecting one of a plurality of abnormal conditions in the operating conditions of the vehicle sensed by said sensing means, said abnormal condition detecting means causing said drive signal to be replaced with one of a plurality of second drive signals when said abnormal operation condition is detected, each of said one of a plurality of second drive signals having predetermined contents which are constant and do not vary in accordance with the operating conditions of the vehicle, said one of a plurality of second drive signals indicating a corresponding one of a plurality of corresponding abnormal conditions so that the information on said tachometer indicates abnormal conditions in place of operating conditions said second drive signal indicating a corresponding one of a plurality of corresponding abnormal conditions, wherein a first one of the plurality of second drive signals moves said needle to a first position on the tachometer and a second one of the plurality drive signals moves said needle to a second position on the tachometer which is different than said first position.

19. An indicating device for a vehicle comprising:

sensing means, for sensing operating conditions in the vehicle;

drive signal generating means, operatively connected to said sensing means, for generating a first drive signal, said first drive signal having contents corresponding to the operating conditions of the vehicle;

indicating means operatively connected to said drive signal means, for providing information concerning the operating conditions of an engine in the vehicle;

said drive signal generating means controlling the providing of said first drive signal provided to said indicating means;

said drive signal generating means including, abnormal condition detecting means, operatively connected to said sensing means, for detecting one of a plurality of abnormal conditions in the operating conditions of the vehicle sensed by said sensing means, said abnormal condition detecting means causing said drive signal to be replaced with at least one of a plurality of second drive signals when said abnormal operation condition is detected, each of said at least one of a plurality of second drive signals having predetermined contents which are constant and do not vary in accordance with the operating conditions of the vehicle, said at least one of a plurality of second drive signals indicating a corresponding one of a plurality of abnormal conditions, wherein a first one of the plurality of second drive signals indicates one abnormal condition on said indicating mean by using a multi level positioner indicator and a second one of the plurality of drive signals indicates another abnormal condition on said indicating means by using said multi-level positioner indicator.

20. The indicating device as claimed in claim 19, wherein the value of each of said second drive signals is different from each other.

21. The indicating device as claimed in claim 19, wherein each of said second drive signals is actuated by a one-shot pulse generator which are in an off mode when normal conditions are present.

* * * * *